United States Patent [19]

Hoenisch

[11] 4,264,239
[45] Apr. 28, 1981

[54] ICE TRANSPORT AND DISPENSING SYSTEM

[75] Inventor: Walter H. Hoenisch, Albert Lea, Minn.

[73] Assignee: King-Seeley Thermos Co., Prospect Heights, Ill.

[21] Appl. No.: 906,225

[22] Filed: May 15, 1978

Related U.S. Application Data

[60] Division of Ser. No. 622,151, Oct. 14, 1975, which is a continuation of Ser. No. 395,712, Sep. 10, 1973, abandoned.

[51] Int. Cl.³ .............................................. B65G 53/58
[52] U.S. Cl. ..................................................... 406/83
[58] Field of Search ........................... 302/28, 59, 2 R; 181/249, 255; 62/344; 406/28, 12, 14, 83, 84, 154

[56] References Cited

U.S. PATENT DOCUMENTS

| 984,890 | 2/1911 | Dudderar | 181/255 |
|---|---|---|---|
| 2,922,486 | 1/1960 | McRee et al. | 181/255 X |
| 3,104,078 | 9/1963 | Buchwald et al. | 406/28 |
| 3,329,237 | 7/1967 | Straw | 181/249 |
| 3,580,416 | 5/1971 | Hoenisch | 221/203 |
| 3,664,354 | 5/1972 | Minbiole, Jr. et al. | 302/2 R X |
| 3,752,260 | 8/1973 | Heath | 181/249 X |
| 3,769,809 | 11/1973 | Robinson et al. | 62/137 |
| 3,799,622 | 3/1974 | Hek | 302/28 |

Primary Examiner—William E. Tapolcai, Jr.
Attorney, Agent, or Firm—Harness, Dickey & Pierce

[57] ABSTRACT

An apparatus for transferring ice cubes and the like from a first location to a remote second location, the apparatus including a conduit system communicating the two locations and a source of air for causing ice to be moved through the conduit system between the two locations; the apparatus further including diverter means whereby ice cubes being transmitted from the first location to the second location may be diverted via the conduit system to a third location. The invention further includes means for preventing damage to the ice cubes being transmitted through the conduit system due to the high velocity of air being utilized therein and also means for disposing of any melt water which may exist within the conduit system as the ice cubes are being communicated between the various remote locations.

1 Claim, 19 Drawing Figures

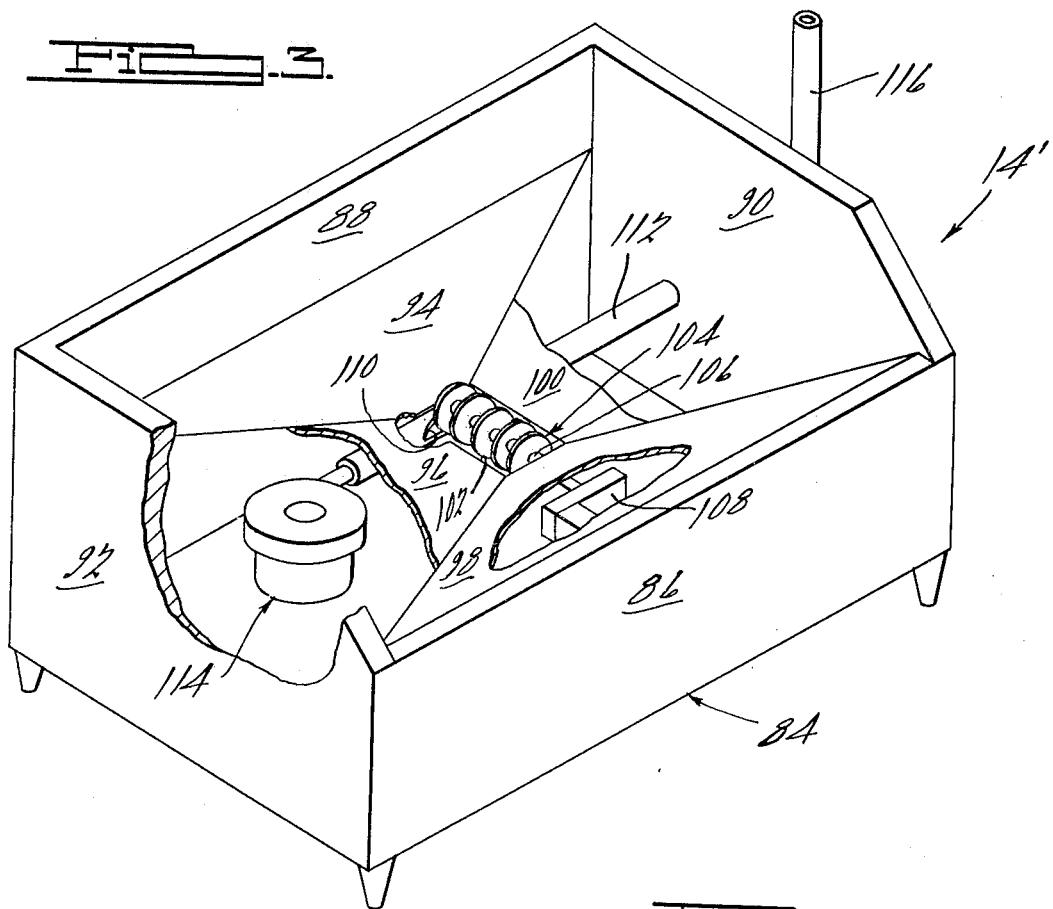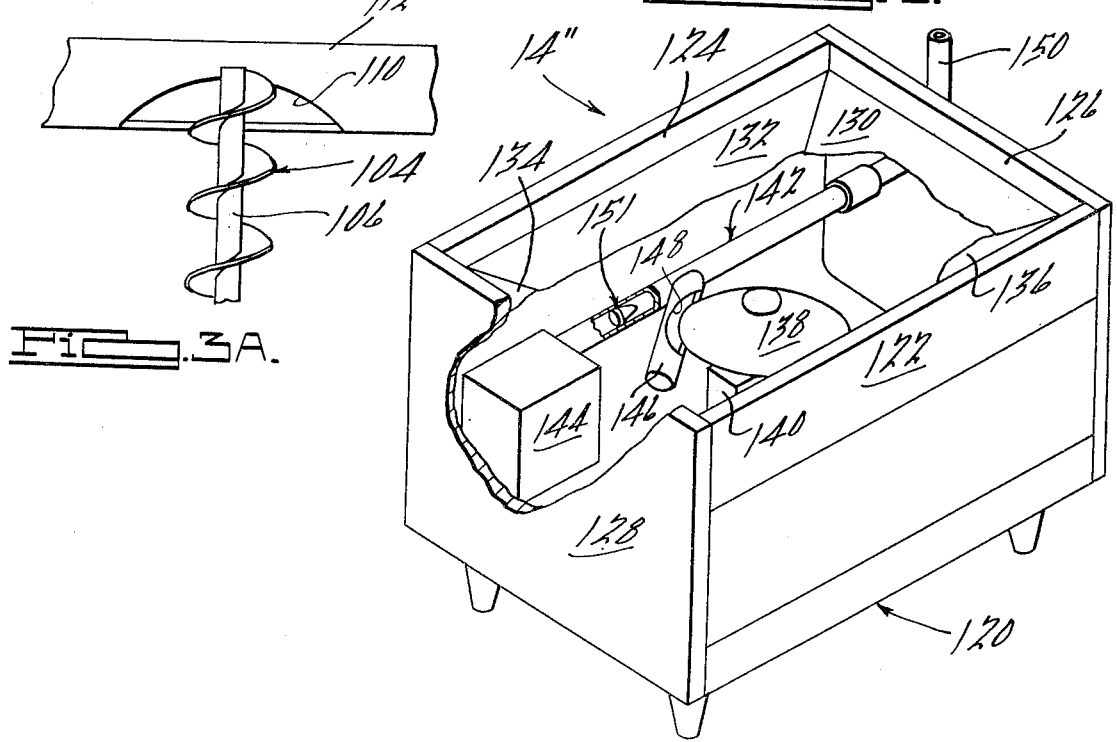

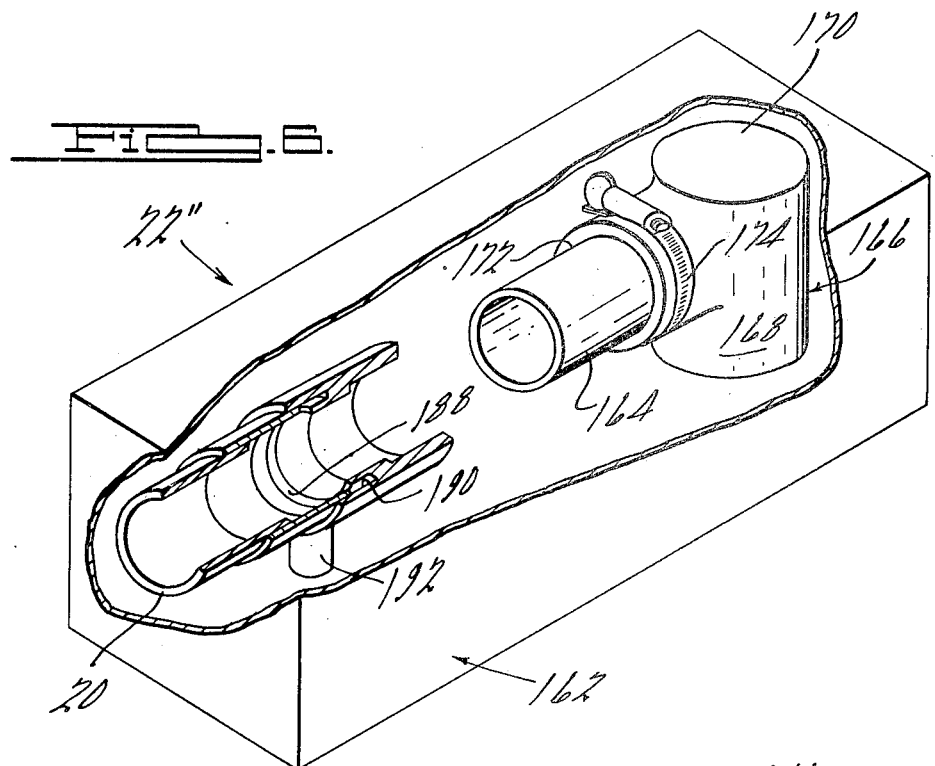
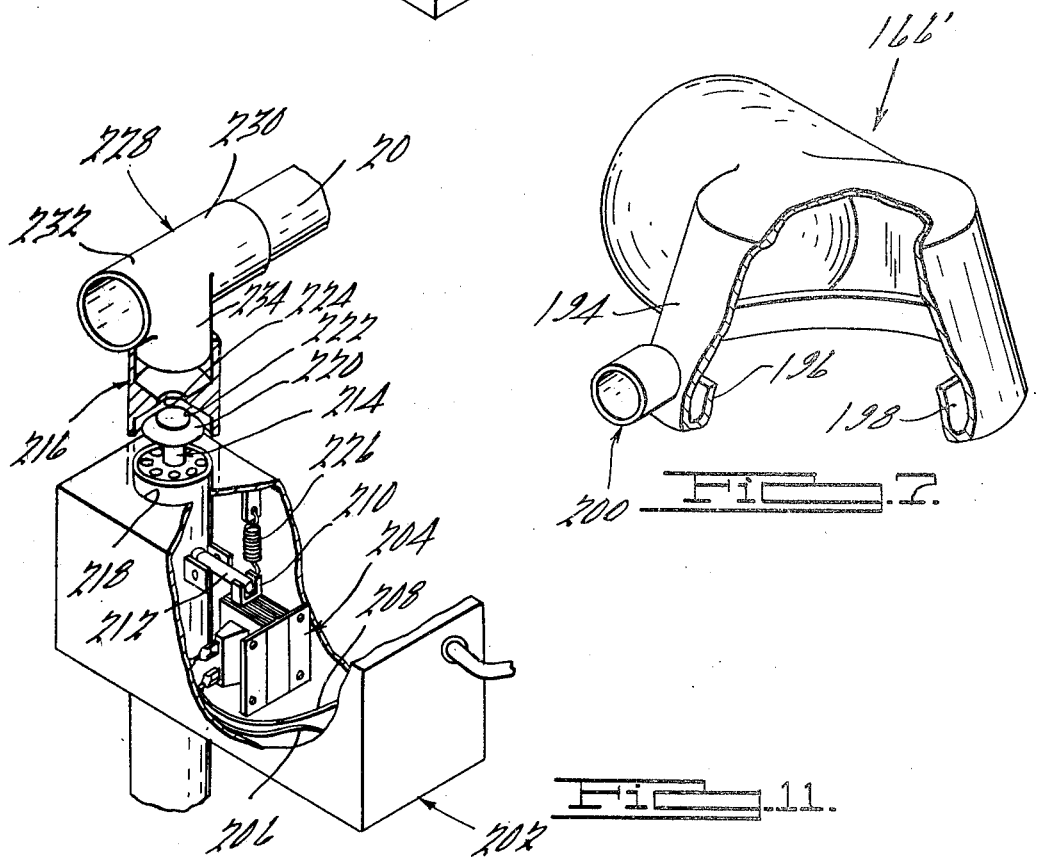

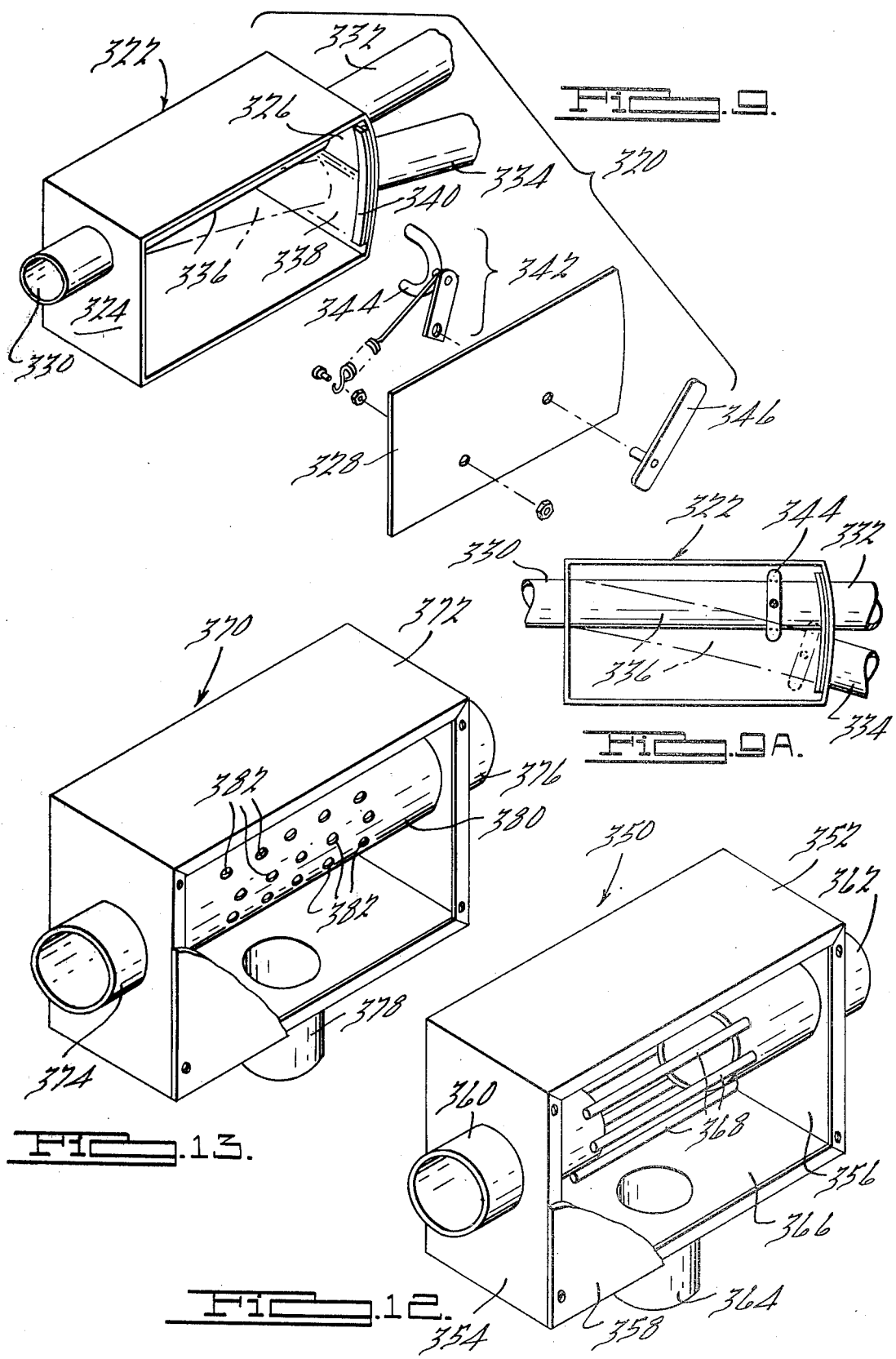

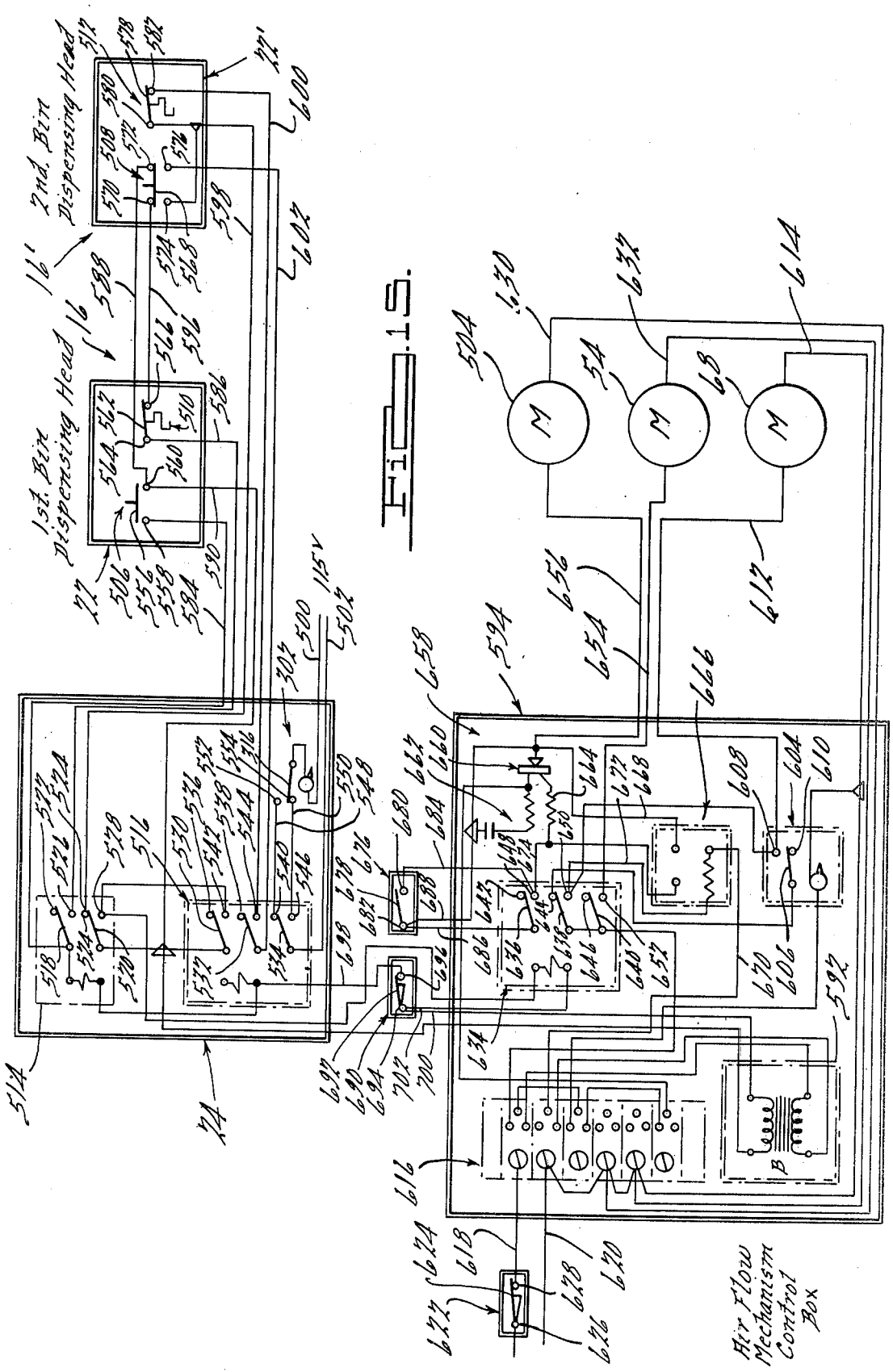

ICE TRANSPORT AND DISPENSING SYSTEM

This is a division of application Ser. No. 622,151 filed Oct. 14, 1975, which is a continuation of Ser. No. 395,712, filed Sep. 10, 1973, now abandoned.

SUMMARY OF THE INVENTION

The present invention relates generally to the subject matter disclosed in U.S. Pat. No. 3,580,416, issued May 25, 1971, for Method and Apparatus for Dispensing Ice Cubes and the Like. Broadly speaking, the aforementioned patent relates to an apparatus for conveying ice cubes from an ice storage bin to a remotely located dispensing head assembly. Extending between and communicating the storage bin and the dispensing head is a conduit through which a relatively high velocity flow of a conveying fluid, namely, air, is transmitted for causing the ice cubes to be transferred through the conduit. As in the apparatus disclosed in the aforementioned patent, the ice transport system of the present invention is adapted to find particularly useful application in an installation wherein an ice cube maker or other ice cube source is located in some remote location, such as in the basement or storage area of a service facility, with the present invention functioning to communicate ice cubes through an air flow conduit system to a location wherein the ice cubes may be stored and/or dispensed, such as at a service bar or the like. The ice transport system of the present invention is designed so as to provide for universality of application to permit the remotely located storage and dispensing sections thereof to be arranged at substantial distances, i.e., in the order of up to several hundred feet, from one another, and, means is provided in the system to assure that ice cubes are in no way damaged due to the high velocity flow of air which causes the cubes to be transmitted through the conduit system in the event the cubes are dispensed at some location located somewhat closer to the source thereof. In accordance with another feature of the present invention, the transport system is provided with an ice cube diverting valve arrangement whereby a plurality of dispensing or storage areas may be utilized, which areas are connected or communicated with one another by means of the aforesaid conduit system, with the diverting valve functioning to selectively cause the cubes to be diverted from one area to another at such time as the quantity of cubes at a selected location drops below a predetermined level. Still other features of the present invention relate to a new and improved transport structure for selectively conveying ice cubes into the conduit system and means for assuring for silent operation of the overall system and preventing against any excess moisture from accumulating within the conduit system and/or storage areas, as will hereinafter be described in detail.

It is accordingly a general object of the present invention to provide a new and improved ice transport system.

It is a more particular object of the present invention to provide a new and improved ice transport system which utilizes a relatively high velocity flow of air for conveying ice cubes from a cube storage area to one or more areas located remote therefrom.

It is still another object of the present invention to provide a new and improved ice transport system which utilizes a diverter valve arrangement for selectively conveying ice cubes to one or more cube storage or dispensing areas.

It is another object of the present invention to provide a new and improved ice transport system of the above character which includes means for relieving excess air pressure within the system and for preventing accumulation of water therewithin.

It is still another object of the present invention to provide a new and improved ice transport system, as above described, which may be operatively associated with a number of different types of transport assemblies for transferring ice cubes from a storage area into the ice conveying conduit system.

It is still a further object of the present invention to provide a new and improved ice transport system which may be easily installed and readily disassembled for purposes of cleaning and the like.

Other objects and advantages of the present invention will become apparent from the following detailed description taken in conjunction with the accompanying drawings.

BRIEF DESCRIPTION OF THE DRAWINGS

FIG. 3 is a view similar to FIG. 2 and illustrates an alternate embodiment of the transport unit adapted for application in the system of the present invention;

FIG. 3A shows a broken perspective view of the details of the screw conveyor of FIG. 3;

FIG. 4 is an elevated perspective view of yet another embodiment of an ice transport system adapted to be operatively associated with the present invention;

FIG. 5 is an elevated perspective view, partially broken away, of a high velocity dispensing head adapted to be used in the ice transport system of the present invention;

FIG. 6 is an elevated perspective view, partially broken away, of a low velocity ice dispensing head adapted to be associated with the present invention;

FIG. 7 is an elevated perspective view, partially broken away, of an alternate construction of the drain trap utilized in FIG. 6;

FIG. 9 is a side elevational view, partially broken away, of a manually operated diverter valve adapted to be associated with the ice transport system of the present invention;

FIG. 9A is a side elevational view of the diverter valve shown in FIG. 9;

FIG. 10 is an elevated perspective view, partially broken away, of the air relief valve adapted to be incorporated in the ice transport system of the present invention;

FIG. 11 is an elevated perspective view, partially broken away, of an automatic drain valve for use in the ice transport system of the present invention;

FIG. 12 is an elevated perspective view, partially broken away, of a combination drain and air muffler unit adapted to be associated with the present invention;

FIG. 13 is a view similar to FIG. 12 and illustrates an alternate embodiment of the combination drain and air muffler shown therein;

FIG. 15 is an electrical circuit diagram of the overall control circuit of a typical embodiment of the ice transport system of the present invention.

DETAILED DESCRIPTION OF THE INVENTION

Figure 1:
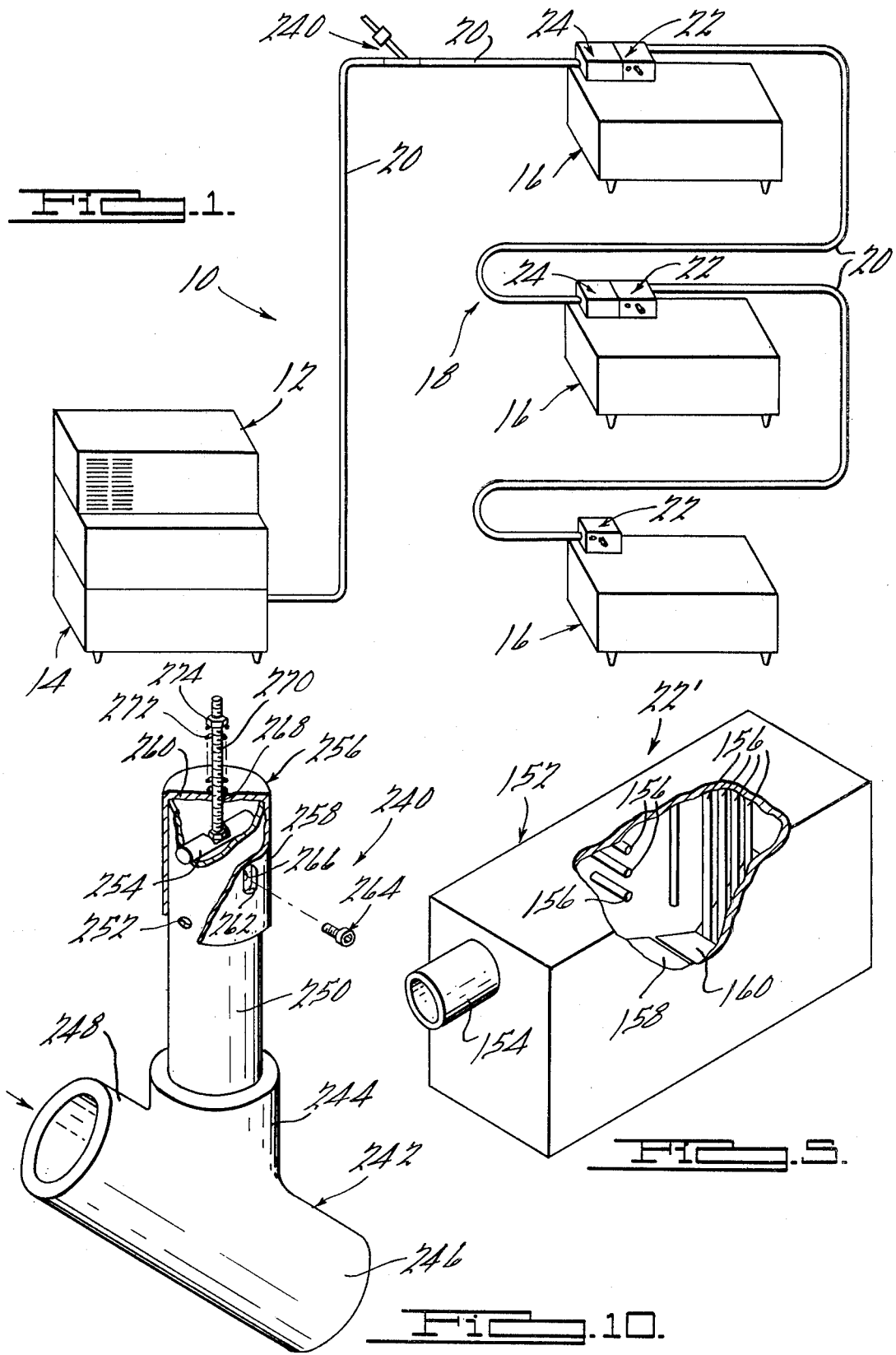
FIG. 1 is an elevated perspective view of an exemplary embodiment of the ice transport system of the present invention.

Broadly speaking, the ice transport system of the present invention is adapted to be utilized in conveying discrete articles, such as ice cubes and the like from an ice storage bin or ice making machine to one or more remotely located storage areas and/or dispensing heads which function to either store or selectively dispense ice cubes into a glass or similar receptacle. Incorporated in the transport system is an ice transport unit which functions to selectively feed individual cubes into a conduit system through which the cubes may be transmitted under the influence of a relatively high velocity flow of air provided by a blower mechanism in the transport unit. In the event two or more remotely located storage bins and/or dispensing heads are incorporated in the transport system, a diverter valve arrangement may be provided at selective serially located of the storage bins, which valves are operable to cause the ice cubes being transmitted through the conduit system being diverted into the storage bin if quantity of cubes therein is below some selected level or magnitude. In the event such associated storage bin does not require additional cubes, the diverter valve functions to cause the cubes to be diverted away from subject storage area, whereby the cubes would flow further through the conduit system to the next sequential storage area or bin in the system. The transport system of the present invention incorporates a number of additional features to adapt the system for efficient operation, including means for preventing any water accumulation within the system, means minimizing the noise associated with the flow of air passing through the conduit system, and related means for preventing damage to the ice cubes as they are conveyed throughout the system, as will hereinafter be described in detail.

It will be noted that the scope of the present invention described herein is in no way intended to be limited to the specific illustrated embodiments, since the remotely located storage and/or dispensing areas may be located relatively close to one another, such as, for example, wherein the ice producing machine is located within a service counter and the dispensing area is located directly thereabove such as in a service bar. Alternatively, the remotely located storage and/or dispensing areas may be located a substantial distance away from the transport unit, such as in the order of up to several hundred feet away.

For convenience of description, the terms "inwardly", "outwardly" and words of similar import will have reference to the geometric center of the various component parts of the transport system hereinafter to be described. Likewise, the terms "upstream" and "downstream" will have reference to the flow of ice cubes through the transport system, with the ice cubes originating at an ice producing machine or similar ice cube source located "upstream" in the system, and being transmitted to the various storage and/or dispensing areas located "downstream" in the system from the cube source.

Referring now in detail to the drawings and in particular to FIG. 1 thereof, an ice transport system 10, in accordance with one preferred embodiment of the present invention, is shown in operative association with an ice producing machine 12, from which ice cubes are distributed by means of an ice feeder or transport unit 14. The ice producing machine 12 may be of any suitable construction known in the art and which is adapted to produce selected quantities of ice in cube or other suitable form. The system 10 includes one or more remotely located ice storage or dispensing bins, generally designated by the numeral 16, which are serially connected with one another and with the ice transport unit 14 by means of a conduit system 18 consisting of a plurality of tubular conduit sections or pipes, generally designated 20. Associated with each of the bins 16 is a dispensing head 22 which functions to direct ice cubes being supplied thereto by the conduit system 18 into the associated bin 16. Additionally, associated with selective of the bins 16 is a diverter valve assembly 24 that functions to cause cubes to be either directed into the storage bin 16 associated therewith or be diverted onto the next serially or sequentially located storage bin 16 in the system. Generally speaking, the transport system 10 operates to transmit ice cubes that are produced by the ice machine 12 through the conduit system 18 to the various remotely located bins 16. The transport unit 14 includes a blower mechanism which functions to supply a relatively high velocity flow of air through the conduit system 18, which flow of air carries the cubes produced by the machine 12 from the unit 14 throughout the various conduits 20, with the cubes being selectively dispensed via the dispensing heads 22 into the associated of the bins 16. As will be described, the diverter valve assemblies 24, which may be either manually or automatically operated, function to cause the cubes flowing through the conduit system 18 to be either diverted into a particular bin or permit the cubes to continue flowing through the system 18 to the next sequentially located bin 16.

Figure 2:
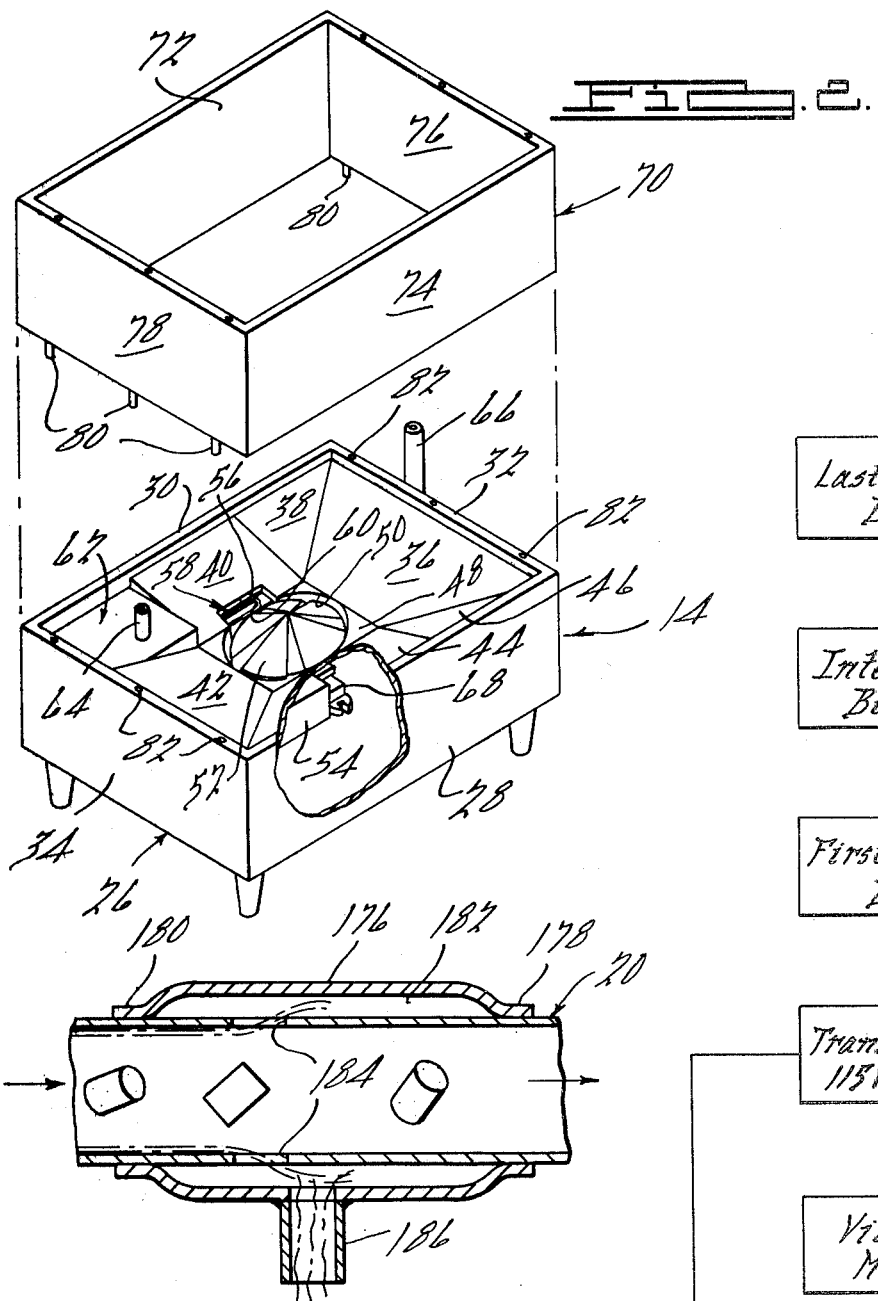
FIG. 2 is an elevated perspective view of one embodiment of the ice transport unit utilized in the system of the present invention.

Referring now in detail to one preferred embodiment of the ice transport unit 14, as shown in FIG. 2, the unit 14 comprises a generally rectangular-shaped enclosure or housing 26 consisting of a pair of spaced parallel upstanding side walls 28 and 30 and a pair of end walls 32 and 34 arranged at generally right angles to and extending between the side walls 28, 30. Disposed interiorly of the enclosure 26 is a plurality of downwardly and inwardly inclined panels 36–46. The panels 36–46 are oriented such that their respective uppermost edges are adjacent to the upper edge of the enclosure 26, with the lower innermost portions of the panels 36–46 terminating adjacent a generally flat horizontally extending bottom section 48. The section 48 is formed with a central annular opening 50 within which a generally frusto-conical agitating disc 52 is located. The disc 52 is adapted to be rotatable about a generally vertically disposed axis by means of a suitable electrically energized motor 54 that is disposed interiorly of the enclosure 26 below the panels 36–46, whereby to cause ice cubes within the enclosure 26 to move toward a recess or opening 56 formed within the lower end of the panel 40. As shown in FIG. 2, the recess 56 provides for the communication of ice cubes to a generally horizontally disposed conduit 58 which is formed with an inlet opening 60 arranged in registry within the recess 56.

The conduit 58 is communicable with an air blower 62 consisting of a suitable electrically energized motor (not shown) and having an air intake conduit or pipe 64 extending generally vertically upwardly from the enclosure 26 and preferably of a sufficient vertical length such that the inlet or upper end thereof is disposed above the quantity of ice cubes stored within the enclosure 26, whereby to provide for unobstructed air intake by the blower 62. As will be appreciated by those skilled in the art, the blower 62 is adapted to conduct air through the air inlet conduit 64 and force the air through the conduit 58, where such air and the ice cubes transmitted or conveyed thereby will flow from the unit 14 through an air outlet conduit 66 which is in turn communicable with the conduit system 18. In accordance with one of the features of the present invention, the transport unit 14 is provided with an electrically energized vibratory motor 68 which is adapted to function in effecting vibratory movement of certain of the aforementioned inclined panels, preferably the panels 36 and 42, whereby to cause ice cubes stored within the enclosure 26 to move downwardly toward the agitating disc 52 where the same may be transferred through the opening 60 of the conduit 58. A suitable time clock may be provided to effect energization of the vibratory panel motor 68 for a predetermined periodic interval, for example, for about 10 to 15 seconds every 30 minutes, thus preventing bridging or similar objectionable adherance of the ice cubes stored within the enclosure 26. In addition, the vibratory motor 68 preferably operates concurrently with rotation of the agitator disc 52 in order to supplement the action of the disc 52 in causing ice cubes to move downwardly toward the opening 60 in the conduit 58.

It is contemplated that the ice making machine 12 may be mounted directly above the transport unit 14, whereby ice cubes produced thereby may drop downwardly into the enclosure 26; however, since such an arrangement would provide for only limited storage of ice cubes within the enclosure 26, in accordance with one feature of the present invention, one or more generally rectangular-shaped ice storage sleeves, one of which is shown in FIG. 2 and designated by the numeral 70, may be surmounted above the enclosure 26 and be located interjacent the unit 14 and the associated ice making machine 12. As best seen in FIG. 2, the sleeve 70 is of a generally rectangular configuration and comprises a pair of spaced parallel side walls 72, 74 and a pair of end walls 76, 78. The dimensions of the walls 72–78 are preferably the same as the walls 28–34 of the enclosure 26, whereby the sleeve 70 may be mounted directly upon the upper edge of the enclosure 26 in the manner best shown in FIG. 1. Means in the form of a plurality of downwardly extending mounting or alignment pins 80 may be provided on the lower side of the sleeve 70, which pins 80 are adapted to be nestingly received in a plurality of complementary-shaped apertures or bores 82 formed around the upper edge of the enclosure 26, whereby to permit the sleeve 70 to be positively supported upon and aligned with the enclosure 26. As will be appreciated by those skilled in the art, one or more of the sleeves 70 may be mounted one on top of one another in order to provide any desired quantity of ice cube storage interjacent the ice producing machine 12 and transport unit 14, depending on the required capacity of a particular installation.

FIGS. 3 and 3A disclose a slightly modified embodiment of the ice transport unit shown in FIG. 2 which may be operatively associated with the ice transport system 10 of the present invention. More particularly, FIGS. 3 and 3A disclose an ice transport unit 14' which has a generally open upper ended four-sided enclosure 84 consisting of a pair of spaced-apart side walls 86, 88 and a pair of end walls 90, 92. The unit 14' includes a plurality of downwardly and inwardly inclined panels 94, 96, 98 and 100 which terminate at their lower inner ends adjacent a generally transversely extending horizontal opening 102 within which a rotatable feed auger 104 is located. The auger 104 is rotatably mounted upon a generally horizontal shaft 106 which is adapted to be drivingly rotated by means of a suitable auger motor 108. The end of the auger 102 opposite the motor 108 terminates adjacent an opening 110 formed in a generally horizontally extending transport or feed conduit 112 which is communicable at one end thereof with an air blower 114 and at the opposite end with an outlet conduit 116 which is adapted to be communicable with the conduit system 18 of the transport system 10. As will be appreciated by those skilled in the art, upon energization of the motor 108, the auger 104 will rotate, thereby carrying the ice cubes disposed within the enclosure 108 toward the opening 110 in the conduit 112. Ice cubes which are thus transferred by the auger 104 will drop downwardly into the opening 110 where the same will be carried by means of the flow of air produced by the blower 114 through the conduit 112 and eventually into the conduit system 18 where the cubes will be delivered throughout the associated system.

FIG. 4 illustrates yet another embodiment of the transfer unit shown in FIG. 2 wherein a transport unit 14" is shown as comprising an open upper ended enclosure 120 comprising a pair of side walls 122, 124 and a pair of end walls 126, 128. The enclosure 120 is provided with a plurality of downwardly and inwardly inclined panels 130, 132, 134 and 136 which terminate at their inner lower ends adjacent a rotatable agitator disc 138 similar to the disc 52 hereinabove described. The disc 138 is adapted to be rotated by means of an associated electrically energized motor 140, whereby to cause ice cubes disposed within the enclosure 120 to be moved toward a feed or transport conduit 142 which extends generally horizontally within the enclosure 120. The inlet end of the conduit 142 is communicable with a blower motor 144 which is adapted to provide a source of relatively high velocity air which flows through the conduit 142 for transferring ice cubes from the enclosure 120 to the associated conduit system. The conduit 142 is formed with an inlet conduit section 146 which is formed with ice cube ingress opening 148 and is communicable with the interior of the conduit 142, whereby ice cubes which are introduced into the opening 148 will flow through the conduit section 146 into the conduit 142. The conduit section 146 is arranged at an angle relative to the axis of the conduit 142 and is also arranged generally tangentially to the periphery of the agitator disc 128, as illustrated. The outlet end of the conduit 142 is communicable with an outlet conduit 150 which is in turn communicable with the conduit system 18. It is contemplated that a suitable nozzle or the like 151 may be mounted within the conduit 142 directly upstream from the conduit section 146, which nozzle is intended to increase the velocity of the air flowing through the conduit 142, whereby ice cubes which are transferred adjacent the opening 148 by the agitator disc 138 will be drawn by suction through the opening 148 and will thereafter be transferred under the influence of the air flow within the conduit 142 throughout the transport system 10.

The conduit system 18 functions generally to operatively communicate the transfer unit 14 with the respective ice dispensing heads 22, hereafter to be described, and may be fabricated of either rigid or flexible material, such as a suitable sanitary molded plastic. The conduit 20 may be of any suitable cross-sectional size, depending upon the size ice cubes which are to be transmitted therethrough. A 2" I.D. conduit has been found to be satisfactory for large and medium size ice cubes, while a 1½" I.D. conduit has been found acceptable for smaller ice cubes. In selecting the size of the conduit 20, it is important that the I.D. thereof be large enough so that the cubes will not become jammed; however, it is also important that the I.D. be kept small enough to prevent too much air velocity from passing around the cubes, as will be appreciated by those skilled in the art.

It has been found that different types of dispensing heads are preferable for different types of applications, depending upon the overall length or distance over which the ice cubes are transported. When the cubes are to be transported a distance in the order of 40-50 feet, the cubes travel at a relatively high velocity and consequently the ice may become broken if it is not properly dispensed or transferred from the conduit into a remote storage bin, dispensing apparatus or the like. Since the velocity at which the cubes move cannot be reduced by merely reducing the air velocity due to impairment of the vertical lift ability of the system 10, it is necessary to reduce the velocity of the cubes at the point where they are discharged into the storage bin. In accordance with the present invention, a preferably high velocity dispensing head 22' is shown in FIG. 5 as comprising an exterior enclosure 152 which is adapted, for example, to be mounted on the upper side of a storage bin, such as the bin 16 shown in FIG. 1. The enclosure 152 includes an inlet conduit or fitting 154 which is adapted to be connected to an outlet end portion of the associated conduit 20 and through which ice may be transferred interiorly of the enclosure 152. Disposed within the enclosure 152 is a plurality of inwardly projecting cantilevered fingers which are preferably fabricated of a flexible material, such as plastic, and which are adapted to be arranged in a manner such that ice cubes entering into the enclosure 152 impinge thereagainst, with the result that the forward momentum of the cubes will be stopped or at least substantially reduced. After the cubes impinge against the fingers 156, they are intended to drop downwardly upon the upper side of an inwardly and downwardly inclined ramp or slide 158, from where the cubes will move under the influence of gravity, for example, toward and through a discharge door 160 in the lower end of the enclosure 152. As will be appreciated, the door may be communicable with a suitable discharge spout or alternatively with the interior of the bin 16, depending upon the particular installation of the dispensing head 22'.

An alternate construction of the dispensing head on the present invention is shown in FIG. 16 wherein a dispensing head 22" is provided with an enclosure 162 analogous to the aforedescribed enclosure 152. Disposed interiorly of the enclosure 162 is a conduit fitting 164 which may be communicable directly with the conduit 20 or connected therewith via a drain fitting hereafter to be described. The fitting 164 includes a discharge element 166 comprising a generally cylindrical body 168 arranged at generally right angles to the inlet fitting 164. The upper end of the body 168 is closed, as seen at 170. If desired, the body 138 may be formed with an integral inlet section 172 within which the conduit 20 or inlet fitting 164 may be fixedly secured, for example, by means of a suitable hose clamp or the like 174. The lower end of the body 168 is open, whereby to permit cubes communicated thereto to drop downwardly toward and into an associated storage bin or an associated discharge spout, as will be appreciated by those skilled in the art. The dispensing head 22" is particularly adapted for use in dispensing ice cubes which are traveling throughout the conduit system 18 at a relatively low velocity and thus do not require the momentum reducing fingers or the like hereinabove described for preventing ice breakage preparatory to being dispensed from the conduit system 18.

Figure 6A:
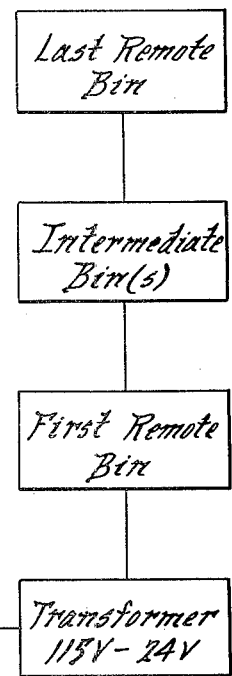
FIG. 6A is a schematic representation of the drain trap utilized in the dispensing head shown in FIG. 6.

It is to be noted that as ice cubes are communicated throughout the conduit system 18, such cubes tend to travel in a relatively straight line and at the center or along the axis of the conduits 20, with a cushion of relatively high velocity air separating the cubes from the inner periphery of the associated conduits 20. The air traveling around the cubes tends to produce only a moderate amount of ice meltage or water, which water has been found to be forced outwardly under the influence of the flow of air toward the periphery of the conduit 20 or other component parts of the transport system 10 through which the ice may be passing. This melt water tends to cling or adhere to the periphery of the conduits and thus may be caught or trapped in a manner hereafter to be described before the ice reaches its ultimate destination, such as the storage bins 16. Although various types of water traps or drain arrangements will cooperate with the ice transport system 10 to take advantage of the aforedescribed phenomena of the melt water adhering to the periphery of the conduit 20. By way of example and as shown in FIG. 6A, one preferred water trap consists of an annular sleeve provided around the outer periphery of the conduit 20 at any appropriate location, which sleeve, herein designated by the numeral 176, is preferably slightly larger in diameter than the O.D. of the conduit 20 and has the opposite ends thereof swaged inwardly, as seen in 178, 180, whereby to define a chamber 182 around a section of the conduit 20. The chamber 182 is communicable with the interior of the conduit 20 by means of one or more circumferentially spaced apertures 184 that are formed in the conduit 20, which apertures are adapted to communicate the melt water flowing along the I.D. of the conduit 20 into the chamber 182. This melt water may then be communicated via a suitable drain line or the like 186 to an external drain for the system 10 and thereby avoid the transmission of the melt water to the storage bin 16.

With reference to FIG. 6, the inlet conduit or fitting 164 by which the conduit 20 is connected to the discharge element 166 may be provided with an interior peripheral slot or recess 188 which is communicable with an annular chamber 190 analogous to the chamber 182 and into which melt water is intended to flow as the ice is transmitted from the conduit 20 into the discharge element 166. The chamber 190 may be communicable with a suitable exterior drain via a suitable drain line or the like 192, as illustrated.

FIG. 7 illustrates a modified embodiment of the discharge element 166 and is identified by the numeral 166'. The element 166' includes a downwardly and outwardly inclined or tapered side wall 194 which terminates at its lower end in an inwardly and upwardly directed reverse flange 196 defining an annular channel 198. As ice cubes are introduced into the element 166', they are dropped downwardly through the lower open end thereof into the associated storage bin and any melt water which may exist will flow into the channel 198 from where it may be discharged via a suitable drain conduit or the like 200. It will be appreciated, of course, that various other types of drain arrangements may be utilized without departing from the scope of the present invention, as will hereinafter be described.

For certain types of installations, it may be desirable to provide an auxiliary drain valve at one or more locations within the conduit 20, particularly in situations wherein portions of the conduit 20 are located considerably below the associated components of the system 10. A typical drain valve for use in such areas of the conduit 20 is shown in FIG. 11 and is shown as generally comprising an enclosure 202 adapted to house an electrically energized actuating solenoid 204 that may be connected with the electrical control system of the present invention by means of suitable electrical conductors 206 and 208. The solenoid 204 includes an actuating element 210 which is connected via a linkage 212 with a vertically reciprocable valve member 214 located within a drain conduit 216 that extends through an opening 218 in the enclosure 202. The valve member 214 includes an annular valve head 220 adapted to be moved toward and away from engagement with a valve seat 222 so as to open and close a drain port 224. The valve member 214 is spring biased under the influence of a spring 226 toward an open position, whereby to permit melt water within the conduit 20 to be communicable via a T fitting 228 into the conduit 216. As shown, the fitting 228 includes coaxial sections 230 and 232 that are connected to adjacent ends of the conduit 20, with the fitting 228 further including a downwardly extending section 234 connected to the upper end of the drain conduit 216. The lower end of the conduit 216 may be communicable with any external drain. By virtue of the spring 226, the valve head 220 is normally spaced away from the valve seat 222 whereby to permit any water within the system to pass downwardly through the port 224 to the external drain. At such time as the system is operating to cause cubes to be communicated through the conduit 20, the solenoid 204 will be energized, resulting in the valve head 220 closing the port 224. Likewise, at such time that as a transporting cycle is terminated, the solenoid 204 will be deenergized and the valve member 214 will again move downwardly under the influence of the spring 226 to again open the drain port 224.

In certain types of applications wherein relatively long distances exist between the transport unit 12 and the associated storage bins 16, it is possible that an undesirable back pressure may be created within the conduit 20 due to the fact that the air does not escape from the dispensing head 22 as fast as it is introduced into the conduit system 18 in the transport unit. In such installations, it has been found desirable to provide an air relief valve, such as is shown in FIGS. 1 and 10 and generally designated by the numeral 240. The valve 240 is shown as comprising a T fitting 242 having an air outlet section 244 and opposed end sections 246, 248, the latter of which are communicable with adjacent end portions of the conduit 20 through which high velocity air and ice is communicated. The outlet section 244 is communicable with a conduit section 250, the upper end of which is formed with a plurality of circumferentially spaced radially disposed apertures or ports, generally designated 252. Extending diametrically through the upper end of the conduit section 250 above the ports 252 is a support member 254 which is adapted to operatively support a cup-shaped closure cap 256 that is telescopically received on the outer end of the conduit section 250. The cap 256 includes a cylindrical side wall 258 which extends around the outer periphery of the conduit section 250 and is closed at its upper end by an end portion 260. The side wall 258 is formed with an elongated slot 262 through which a guide member 264, such as a screw, bolt or the like, extends, the inner end of the member 264 being threadably received within a bore 266 that is formed within the conduit section 250. The end potion 260 of the cap 256 is formed with a central opening 268 through which an outwardly extending axially arranged threaded rod 270 is disposed, the lower end of the rod 270 being operatively secured to the support member 254. Carried upon the outer end of the rod 270 is a helical coil spring 272, the inner end of which bears against the cap 256 and the outer end of which bears against an adjustment nut or the like 274 threadably received on the outer end of the rod 270. In operation of the valve 240, the cap normally assumes the position shown in FIG. 10 wherein the cylindrical side wall 258 closes the ports 252; however, at such time as the back pressure within the conduit 20 exceeds some predetermined level, the cap 256 will be baised upwardly against the resistance of the spring 272, whereby to expose the ports 252 to atmosphere and thus permit relief of the back pressure condition within the conduit system 18, after which time the cap 256 will be spring biased downwardly to its normally closed position shown in FIG. 10.

Figure 8:
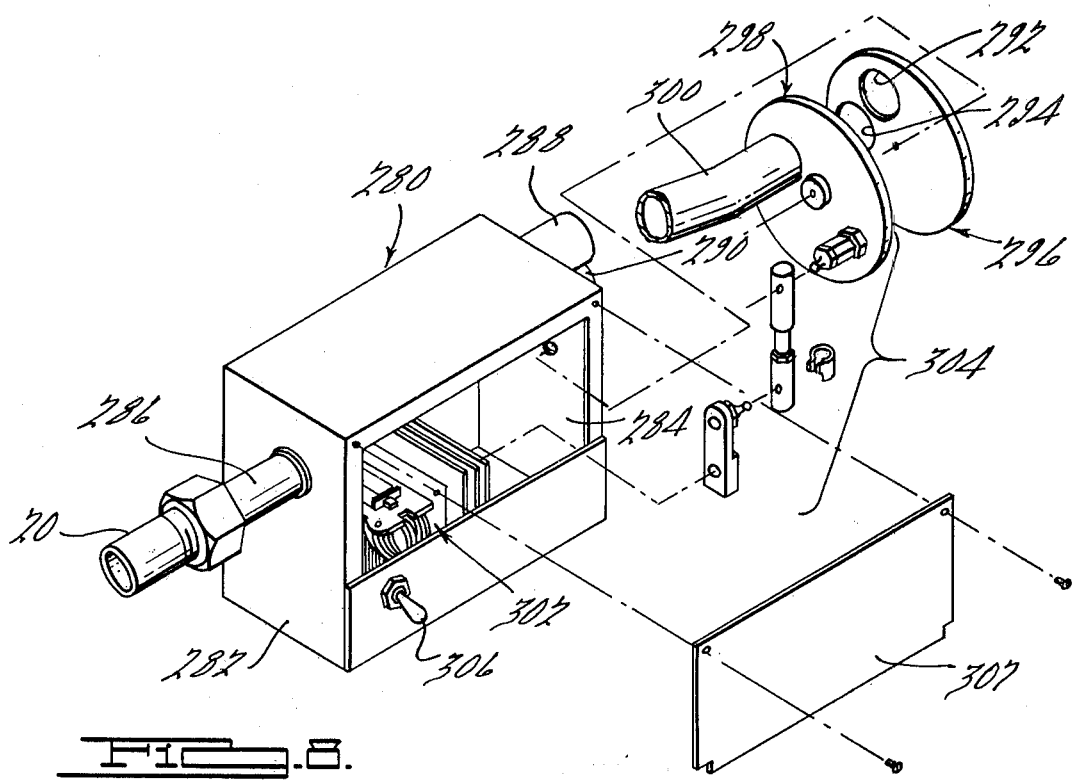
FIG. 8 is an exploded assembly view of one embodiment of the diverter valve incorporated in the ice transport system of the present invention.
Figure 8A:
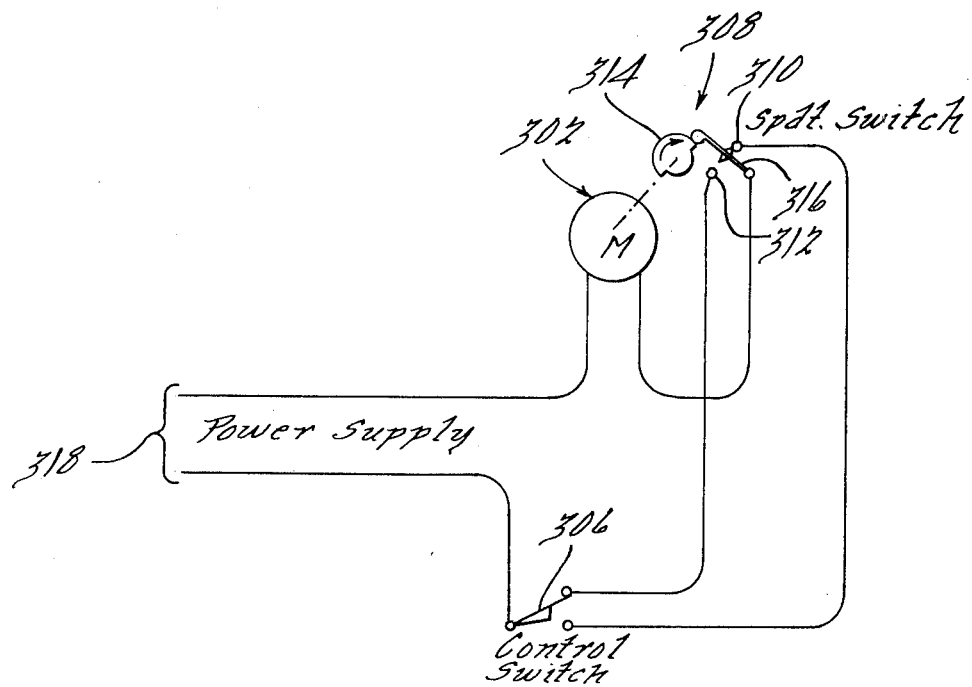
FIG. 8A is a schematic electrical circuit associated with the diverter valve shown in FIG. 8.

As previously mentioned, one of the features of the present invention resides in the utilization of the ice diverting valves 24 at one or more of the remotely located storage bins 16, which valves 24 function to divert ice cubes into the associated bin, or alternatively, to cause said cubes to be communicated on to the next sequentially located storage bin, depending upon whether or not one or more of the storage bins 16 requires such additional cubes. One preferred embodiment of such a diverter valve 24 is shown in FIG. 8 as comprising an exterior enclosure 280 which is adapted, for example, to be mounted upon the upper side of the associated storage bin 16 in the manner shown in FIG. 1. The enclosure 280 comprises a pair of spaced apart end walls 282, 284, the former of which is provided with an inlet fitting 286 that communicates ice from the conduit 20 into the valve 24. The end wall 284 is provided with a pair of conduits 288 and 290 which may be communicable, for example, with the adjacent storage bin 16 and with a remotely located storage bin, respectively. Generally speaking, the diverter valve 24 is adapted to operate in causing ice cubes which are supplied to the inlet fitting 286 to be communicated to one or the other of the conduits 288 or 290. Toward this end, a pair of apertures 292 and 294 are formed in a relatively fixedly mounted conduit support disc 296, which apertures 292, 294 are aligned with the conduits 288 and 290. Disposed directly interiorly from the disc 296 is a rotatable disc 298 which has one end of a flexible conduit 300 connected thereto and adapted to communicate ice therethrough. The opposite end of the conduit 300 is communicable with the inlet fitting 286, and the disc 298 is adapted to rotate under the influence of an electrical motor 302 in a manner such that the outlet end of the conduit 300 is selectively communicable with either of the apertures 292 or 294 and hence with either of the conduits 288 or 290. The motor 302 is connected to the disc 298 with any suitable linkage arrangement such as that designated by the numeral 304 in FIG. 8, whereupon energization of the motor 302, the disc 298 will rotate in the above-described manner. A control switch 306 may be provided on the enclosure 280 directly below a removable access door 307. With reference to FIG. 8A, the switch 306 may be and preferably is operatively associated with a cam operated switch 308 which includes a pair of terminals or contacts 310 and 312 and a rotatable cam element 314 that rotates upon energization of the motor 302. The switch 308 includes an actuating arm 316 which rides upon the periphery of the cam 314 and is caused to move between a first position engaged with the contact 310 and a second position engaged with the contact 312. In operation of the diverter valve 24, a source of electrical energy 318 is connected to the motor 302 thrugh the switches 306 and 308 until such time as the cam 314 rotates a sufficient amount to open the electrical circuit to the motor 302 which occurs when the disc 298 has rotated such that the conduit 300 is aligned with one of the conduits 288 or 290. Upon actuation of the switch 306, the motor will be energized such that the disc 298 will be rotated in the opposite direction to a position wherein the conduit 300 is aligned with the other of the conduits 288, 290, at which time the cam 314 and actuating arm 316 will again effect deenergization of the motor 302. If desired, the control circuit for the motor 302 may be connected via a thermostatic control circuit means such that the diverter valve 24 will operate to automatically divert ice being supplied through to the appropriate outlet conduit 288 or 290 which requires a fresh supply of ice. Of course, various other means for controlling the operation of the valve 24 may be utilized without departing from the scope or fair meaning of the present invention. It is to be noted that the present invention is not intended to be limited to a diverter valve having only two outlet conduits, since it is conceivable that an additional number of conduits, over and above the conduits 288, 290, could have ice supplied through by means of the conduit 300. Such an arrangement would, of course, only require that the disc 298 be rotatable to a greater degree to effect alignment of the conduit 300 with such additional outlet conduits.

FIGS. 9 and 9A illustrate another embodiment of a diverter valve which may be operatively associated with the present invention. The valve shown in FIGS. 9 and 9A is generally designated by the numeral 320 and is adapted to be manually actuated instead of being automatically actuated via an electrical motor and/or control circuit as above described. The valve 320 includes an enclosure 322 having opposed end walls 324 and 326 and a removable access panel or wall 328 on one side thereof. The end wall 324 is provided with an inlet fitting 330 which may be connected to an ice supply conduit 20, while the opposite end wall 326 is provided with a pair of outlet conduits 332 and 334 which may be communicable with any adjacent or remotely located storage bins or the like. Extending longitudinally within the enclosure 320 is a flexible ice conduit 336, one end of which is communicable with the inlet fittig 330 and the opposite end of which is connected to a slidable plate 338 having an outlet opening (not shown) formed therein. The plate 338 is mounted for vertical sliding movement along the interior side of the end wall 326 by suitable guideway means 340, whereby the plate 338 and outlet end of the conduit 336 may be moved between an upper position wherein the conduit 336 is communicable with the conduit 332, and a lower position wherein the conduit 336 is communicable with the conduit 334. The valve 320 is provided with an adjustment assembly, generally designated by the numeral 342, and which includes a yoke or the like 344 adapted to be surmounted over the conduit 336. Located exteriorly of the enclosure 322 is a manually actuatable handle or the like 346 which is operatively connected to the yoke 344 in a manner such that pivoting the handle 346 results in selective movement of the outlet end of the conduit 336 between positions communicating with the conduit 332 or 334.

For certain applications, particularly where the distance between the transport unit 14 and the remote bin 16 is quite short, i.e., in the order of 40-50 feet, it is desirable to reduce the noise attendant the high velocity flow of air within the conduits 20, as well as reduce the velocity of the ice cubes preparatory to their entering a storage bin or ice dispensing head. One preferred means for effecting such reduction in noise and ice velocity is shown in FIG. 12 as comprising a muffler assembly, generally designated by the numeral 350. The assembly 350 includes an enclosure 352 having spaced end walls 354, 356 and a removable access panel 358. Inlet and outlet fittings 360 and 362 extend through the walls 354 and 356, respectively, and are intended to be communicable with the ice supply conduit 20 by placing the assembly 350 along the ice supply line a few feet upstream from where the conduit enters a dispensing head and/or storage bin. The bottom of the enclosure 352 is provided with a drain fitting 364 mounted in a bottom wall 366. As shown in FIG. 10, the interior ends of the fittings 360, 362 are spaced longitudinally away from one another and are connected by a plurality of rods 368, preferably fabricated of a corrosion resistant material, such as stainless steel, that are arranged parallel to one another and circumferentially spaced about the fittings 360, 362. The rods 368 are spaced apart a sufficient distance to permit any melt water and excess air to escape therebetween and flow out of the enclosure 352 through the drain fitting 364; however, the rods 368 are spaced sufficiently close to one another so as to not interrupt the smooth continuous flow of ice cubes from the fitting 360 to the fitting 362. In other words, the rods 368 are located close enough together to preclude ice from passing therebetween or becoming jammed as they pass from the fitting 360 to the fitting 362.

FIG. 13 illustrates another embodiment of the noise and air velocity reduction means shown in FIG. 10. Such means is in the form of a muffler assembly 370 including an enclosure 372 having inlet and outlet fittings 374 and 376, respectively, and a drain fitting 378. Extending between the fittings 374, 376 is a conduit 380 which is formed with a plurality of perforations or outlet ports 382 which function in the same general manner as the rods 368 in permitting the rapid escape of air and any melt water associated with the flow of ice preparatory to such ice being communicated into a storage bin or the like.

Figure 14:
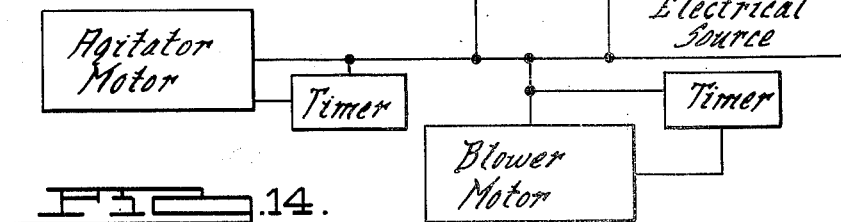
FIG. 14 is a partially schematic view of a typical installation of the ice transport system of the present invention.

FIG. 14 is a schematic representation of the various component parts of a typical installation of the ice transport system of the present invention and illustrates the relationship of the components to one another and to a suitable source of electrical energy. In particular, FIG. 14 shows the transport system 10 in operative association with a suitable source of electrical energy which is intended to be supplied to the vibrator motor for operating the panels 36, 42. Additionally, electrical energy is supplied to the blower motor which supplies a flow of relatively high velocity air through the ice supply conduits 20 of the system 10. Preferably, the blower motor has a capacity in the order of 110 cubic feet per minute and may, for example, consist of a one horse power motor having an operating speed of in the order of 17,500 r.p.m. The blower motor is preferably associated with a timer arrangement, as described in U.S. Pat. No. 3,580,416, which functions to maintain the motor operating for a predetermined time after the termination of each supply cycle in order to clear the supply conduits 20 of any residual ice cubes. The aforesaid electrical source is also connected to the agitator motor which effects rotational movement of the ice agitator disc that causes ice cubes to be moved toward and into the ice supply conduit. A suitable timer arrangement may also be associated with the agitator motor and/or vibratory motor for reasons hereinabove described. The various remotely located dispensing heads and/or storge bins are preferably, although not necessarily, operable on a 24-volt electrical circuit and accordingly, electrical energy is supplied thereto via any suitable transformer means well known in the art. It will be appreciated, of course, that the present invention is in no way limited to any specific number of remotely located dispensing heads or storage bins, nor is it intended to be limited to any specific diverter valve arrangement since ice communicating circuits will vary from installation to installation. Therefore, the above disclosed embodiments are merely presented for purposes of describing an exemplary form of the present invention and are in no way intended to limit the scope of the claims appended hereto.

FIG. 15 illustrates an exemplary embodiment of an electrical control circuit for use in the ice transport system 10 of the present invention. This circuit is representatively shown in combination with two remotely located storage bins 16 and 16', and the circuit is intended to be applicable to the transport unit 14, although it will be apparent to those skilled in the art how such circuit may be easily modified to adapt the same to either of the transport units 14' or 14" hereinabove described. Accordingly, for purposes of conciseness of description, the circuit shown in FIG. 15 will hereinafter be described as being operatively associated with the component parts of the transport unit 14.

The circuit shown in FIG. 13 comprises a pair of primary conductors 500 and 502 which are adapted to be connected to a suitable source of electrical energy, such as a source of 115 volt current. The motor of the blower 62 is represented in FIG. 15 by the numeral 504 and is shown in operative association with the agitator motor 54 and vibrating panel motor 68. The storage bins 16 and 16' are provided with dispensing heads 22 and 22', respectively, with the heads 22, 22' having manually actuatable switches 506, 508, respectively. In addition, the dispensing heads 22, 22' include thermostatically operated switches 510 and 512, respectively, which, together with the switches 506, 508, are connected via the illustrated electrical circuitry with a pair of relays 514 and 516 associated with a diverter valve assembly 24 which, by way of example, would be associated with the storage bin 16 located farthest upstream in the ice flow or conduit circuit 18. The relay 514 includes armatures 518 and 520 which are movable between terminals 522, 524 and 526, 528. The relay 516 includes armatures 530, 532 and 534 which are respectively movable between terminals 536, 538, 540 and terminals 542, 544 and 546, respectively. The motor 302 associated with the diverter valve 24 is controlled by the cam operated switch element 316 which is movable between a pair of terminals 552, 554, the terminals 552, 554 being connected via conductors 548, 550 to the terminals 540, 546.

The switch 516 includes an armature 556 which is movable to and from a position completing an electrical circuit between a pair of terminals 558 and 560. Likewise, the thermostatic switch 510 includes an armature 562 for completing a circuit between terminals 564 and 566. The switch 508 of the dispensing head 16' includes an armature 568 which normally completes a circuit between terminals 570 and 572, with the armature 568 being movable or actuatable to a position opening the circuit between the terminals 570, 572 and closing a circuit between terminals 574 and 576. The thermostatic switch 512 includes an armature 578 which normally completes a circuit between terminals 580 and 582. Terminal 558 is connected via conductor 584 to the armature 518 of the relay 514, while terminal 564 is connected via conductor 586 to terminal 526 of relay 514. Terminal 560 is connected via conductor 588 with the terminal 572 and via conductor 590 with the transformer 592 in the air flow mechanism control box, which may typically be associated with the transport unit 14 and is generally designated by the numeral 594. Terminals 566 and 570 are connected via a conductor 596 and terminals 524 and 580 are connected via a conductor 598. Terminals 544 and 582 are connected via a conductor 600, while the armature 532 of the relay 516 is connected via a conductor 602 with the terminal 576.

The air flow control box 594 includes a timer clock generally designated by the numeral 604 having a clock control armature 606 that is movable between terminals 608 and 610. The terminal 608 is connected to the vibrator motor 68 via a conductor 612, which motor 68 is also connected via a conductor 614 with a terminal block 616. The terminal block 616 is also connected to a suitable source of electrical energy via primary conductors 618 and 620, the former of which is provided with a master control switch 622 having an armature 624 that is movable between positions opening and closing a circuit between terminals 626 and 628. The blower motor 504 and agitator motor 54 are also connected via conductors 630 and 632 to the terminal block 616, as illustrated. The control box 594 also houses a relay 634 having armatures 636, 638 and 640 which are normally engaged with terminals 642, 644 and 646, respectively. The armatures 636, 638 and 640 are movable upon energization of the relay 636 into engagement with terminals 648, 650 and 652, respectively, the latter of which terminal 652 is connected via conductor 654 with the agitator motor 54. The blower motor 504 is connected via conductor 656 with a motor control circuit, generally designated 658, which functions in a conventional manner in controlling operation of the motor 504, particularly upon initial energization thereof. As illustrated, the motor control circuit 658 includes a triac 660, an RC circuit 662 and a gate resistor 664.

Also included in the control box 594 is a time delay switch, generally designated by the numeral 666, which is connected to the motor control 658 via conductor 668 and with the terminal block 616 via conductor 670. The time delay switch 666 is also connected to terminals 650 and 648 of the relay 634 by conductors 672 and 674, respectively. Generally speaking, the time delay switch 666 is operable to maintain the blower motor 504 energized for a predetermined amount of time upon termination of a delivery cycle whereby to assure that all water and/or ice cubes are removed from the conduit system 18 upon deenergization of the transport unit 14.

Two additional switches are provided in the electrical circuitry between the diverter valve assembly 24 and the control box 594. The first of these is generally designated by the numeral 676 and includes an armature 678 which is adapted to complete a circuit between terminals 680 and 682. The terminal 680 is connected with the terminal 648 via conductor 684, while the terminal 682 is connected via conductors 686 and 688 with the armature 636 and the motor control 658, respectively. The switch 676 is intended to provide for independent energization of the blower motor 504 without having any of the other component parts of the transport system 10 operate, whereby to provide for cleaning or purging of the conduit system 18 thereof. The second of the aforementioned switches is shown in FIG. 15 adjacent the switch 676 and is identified by the numeral 690. The switch 690 includes an armature 692 which is adapted to complete a circuit between terminals 694 and 696 that are connected in the electrical circuitry via conductors 698, 700, and 702 with the relay 516, transformer 592 and relay 636, respectively. Generally speaking, the switch 690 is adapted to disconnect the remote electrical portion of the transport system 10 from the control box 594.

In order to correlate the various operational components of the transport system 10, as well as to facilitate understanding the operation of the aforedescribed electrical control system, a brief description of an exemplary operational cycle will now be given.

Assuming that the master switch 622 is closed and that the transport unit 14 is provided with a quantity of ice, and further assuming that the condition of the electrical circuit is as shown in FIG. 15, at such time as it is desired to have ice transported from the transport unit 14 to the most upstream or first storage bin 16, the switch 506 on the dispensing head 22 associated therewith is closed, thereby completing a circuit between conductors 584 and 590 and which in turn results in energization of the relay 514. When this occurs, the armatures 518, 520 move to positions making contact with terminals 526 and 528, whereby to complete a holding circuit through the switches 508 and 510. Upon movement of the armature 520 into engagement with the terminal 528, a circuit is completed to the control box relay 634, resulting in energization thereof. When this occurs, electrical circuits are completed to the blower motor 504 and agitator motor 54 to effect energization thereof. Accordingly, the agitator disc 52 will begin to rotate causing ice cubes within the enclosure 26 to be transferred toward and into the conduit 58, which ice cubes will thereafter be forced under the influence of the air flow produced by the blower motor 54 to be communicated through the conduit system 18 to the dispensing head 22 and hence into the storage bin 16 associated therewith. At such time as the storage bin 16 has a predetermined quantity of ice cubes delivered thereinto, the thermostatic switch 510 will open, opening a circuit between the terminals 564 and 566, resulting in deenergization of the relay 514. Alternatively, in the event the switch 508 on the dispensing head 16' is actuated, a circuit is completed between the terminals 574 and 576, resulting in opening of the circuit to the relay 514 and energization of the relay 516. When this occurs, the armatures 530–534 will be actuated so as to energize the relay 634, which in turn results in energization of the blower motor 504 and agitator motor 54, as above described. The armature 534 of relay 516 will effect energization of the diverter valve motor 302, which will shift the direction of ice flow from the first or upstream dispensing head 522 to the second or downstream head 522'. Thus, ice will be conveyed from the transport unit 14 via the conduit 518 to the second storage bin 16'. Ice cubes will be thereafter delivered to the bin 16' until a predetermined quantity accumulates therein, at which time the thermostatic switch 512 will open. This results in deenergization of the relay 516 and reenergization of the diverter valve motor 302 to cause the flow of ice cubes to be again directed to the first storage bin 22, after which time the system will stop. The time clock 666 is intended to operate to periodically energize the vibrator motor, as above described, thereby assuring against undesirable ice cube bridging within the transport unit 14.

While it will be apparent that the preferred embodiments illustrated herein are well calculated to fulfill the objects above stated, it will be appreciated that the present invention is susceptible to modification, variation and change without departing from the scope of the invention.

I claim:

1. In a dispensing system including conduit means for communicating discrete ice articles between first and second locations and a source of conveying fluid for carrying the ice articles through the conduit means, means disposed between the first and second locations permitting the conveying fluid to escape from the conduit means and thereby reduce the flow velocity of the articles and attendant noise of the fluid passing through the conduit, including an enclosure, inlet and outlet portions connecting said enclosure with said conduit means, and perforated means extending between said inlet and outlet portions permitting conveying fluid being transferred through said conduit means to escape into the interior of said enclosure and including a plurality of axially extending circumferentially spaced rods disposed between said inlet and outlet portions.

* * * * *

UNITED STATES PATENT AND TRADEMARK OFFICE
CERTIFICATE OF CORRECTION

PATENT NO. : 4,264,239
DATED : April 28, 1981
INVENTOR(S) : Walter Harold Hoenisch It is certified that error appears in the above—identified patent and that said Letters Patent is hereby corrected as shown below:

Column 8, line 6, "138" should be --168--. Column 10, line 19, "potion" should be --portion--; Column 10, line 32, "baised" should be --biased--. Column 11, line 24, "thrugh" should be --through--. Column 12, line 2, "fittig" should be --fitting--; Column 12, line 57, "13" should be --11--. Column 13, line 28, "storge" should be --storage--.

Signed and Sealed this

Tenth Day of November 1981

[SEAL]

Attest:

GERALD J. MOSSINGHOFF

Attesting Officer

Commissioner of Patents and Trademarks